Dec. 29, 1970    R. F. McGIVERN    3,551,041

LAMPHOUSE ASSEMBLY FOR PHOTOGRAMMETRIC STEREO MAP PLOTTER

Filed June 21, 1968    3 Sheets-Sheet 1

ROBERT F. McGIVERN
INVENTOR.

BY

AGENT

Dec. 29, 1970     R. F. McGIVERN     3,551,041
LAMPHOUSE ASSEMBLY FOR PHOTOGRAMMETRIC STEREO MAP PLOTTER
Filed June 21, 1968     3 Sheets-Sheet 3
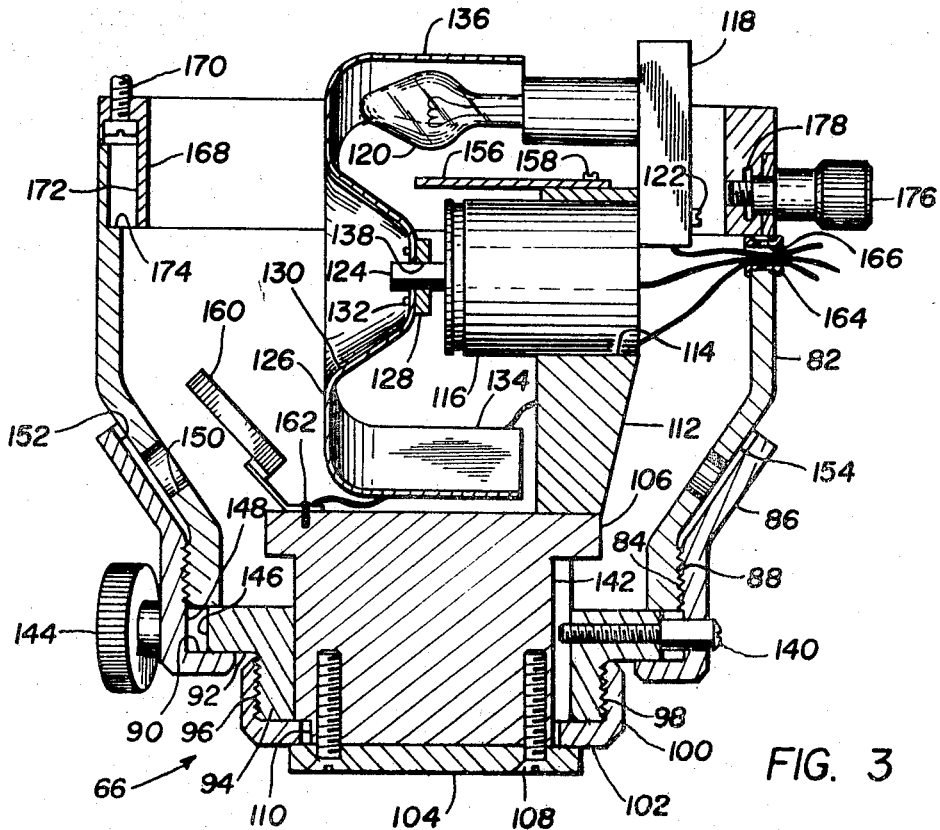
FIG. 3
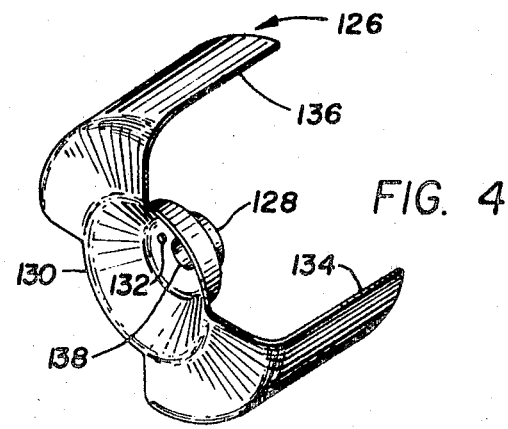
FIG. 4
ROBERT F. McGIVERN
INVENTOR.
AGENT

United States Patent Office 3,551,041
Patented Dec. 29, 1970

3,551,041
LAMPHOUSE ASSEMBLY FOR PHOTOGRAMMETRIC STEREO MAP PLOTTER
Robert F. McGivern, Irondequoit, N.Y., assignor to Bausch & Lomb Incorporated, Rochester, N.Y., a corporation of New York
Filed June 21, 1968, Ser. No. 738,993
Int. Cl. G03b 21/00
U.S. Cl. 353—6
4 Claims

ABSTRACT OF THE DISCLOSURE

An improved lamphouse unit is provided for use in photogrammetric stereo map plotters which employ the concept of the stereo image alternator. A rotating multi-bladed shutter driven by a stepping motor rotates about a quartz-halogen constant brightness lamp.

BACKGROUND OF THE INVENTION

This invention is related to improvements in photogrammetric stereo map plotters and is more particularly concerned with improvements to the lamphouse unit for use with projectors for photogrammetric stereo map plotters which employ the stereo image alternator concept.

The stereo image alternator concept has been developed in recent years for photogrammetric stereo map plotters. This development, by J. William Knouf of the United States Geological Survey, is described in Photogrammetric Engineering, vol. 33, pp. 1113–1116, October 1967. The concept will be described only briefly herein in order that the present invention and the advantages thereof may be more fully understood. Referring now to FIG. 1, wherein there is shown in schematic form a diagram by which the concepts may be explained and by which the perinent areas of the previous state of the art may be set forth.

A pair of stereo projectors 10 and 12, each containing one of a pair of stereo-diapositives, not shown, have a pair of rotating drum type shutters 14 and 16 respectively, associated therewith. The shutters 14 and 16 are located in the exit beams from projectors 10 and 12. Shutter 14 has a pair of diametrically opposed shutter blades 18a and 18b; shutter 16 has like blades 20a and 20b. The blades are each ninety angular degrees in extension and are also separated by ninety angular degrees. When the blades are in the exit beam, the beam is stopped; and when the openings are in the beam, the beam is released. Therefore, when the shutter is rotated through 360 degrees at constant angular velocity, four equal duration periods of time occur, two when transmission occurs and two of nontransmission.

The intermittent output beams from projectors 10 and 12 are phased, by synchronization of the rotation of shutters 14 and 16 such that the beams are alternately projected. The alternately projected stereo images are projected onto the platen 22 of a tracing table 24 where they are viewed by the operator through viewing shutter 26. The shutters 14 and 16 are cooperatively movable by means of telescoping tape members 28 and 30 which connect the tracing table 24 to a shutter movement mechanism, not shown. Therefore, when the tracing table 24 is moved about the shutters adjust to maintain the position of the transmitted beams incident on the platen 22.

The viewing shutter 26 is composed of two oppositely phased shutters, one in phase with each projection shutter, so that when the left projector is transmitting, the left eye is viewing, and conversely for the right side. The repetition rate of the image flashes is generally 50 flashes per second or greater, optimally 60 flashes per second or greater, so that the operator does not perceive a flicker, but rather a steady stereo image.

The stereo image alternator concept has many inherent advantages over the previous systems which utilized anaglyphic filters to separate the images. These include compatability with color diapositives, complete image separation, and a significant increase in brightness.

However, such a system destroys much of the usefulness of those plotters which previously projected the full field of the stereo-diapositives. By locating the swinging shutter after the projection lens in the exit beam, only that portion of the field passing through the projection shutter to the platen is available for viewing. In addition, the requirement of a linkage between the tracing table and the projection shutters limits the freedom of operator to move about at will, or to gain a fuller view by removing the viewing shutter from the tracing table. In addition, necessity for the linkages increases the complexity of the instrument and makes it more difficult to properly adjust and, therefore, less reliable in operation.

In addition, the placing of the projector shutter far away from the lamp in the exit beam has a deleterious effect on the time required to completely cut-off or reinstate the exit beam. The greater the distance between the lamp filament and the shutter blade, the longer the time required to cut-off the beam. Therefore, the average level of brightness drops thereby eliminating some of the gain inherent in the stereo image alternator concept.

SUMMARY OF THE INVENTION

Accordingly, it is an object of the present invention to provide an improved lamphouse assembly for use with photogrammetic stereo map plotters having provision for utilization of the stereo image alternator concept incorporated therein.

A second object of the present invention is to provide such a lamphouse assembly which does not reduce the inherent features of the projector with which it is associated.

It is another object of the present invention to provide such a lamphouse assembly which provides a far shorter cutoff time than is presently possible.

It is a further object of the present invention to provide such a lamphouse assembly which includes a means for maintaining the level of brightness of the output essentially constant.

Briefly, the invention in its broadest aspect comprises a housing having an opening therein and a lamp mounted in the housing. A synchronous motor having a rotatable shaft and a shutter attached to the shaft is also mounted in the housing, the shutter rotating about the envelope of the lamp. The shutter is divided into a plurality of substantially equal angular segments which are alternately transmissive and non-transmissive. Therefore, upon rotation of the motor and shutter at a constant angular velocity light rays from the lamp are alternately stopped by the nontransmissive portion and released by the transmissive portion of the shutter through the opening in the housing.

Further objects, advantages, and features of the invention will be apparent in the arrangement and construction of the constituent parts in detail as set forth in the following specification taken together with the accompanying drawing.

DESCRIPTION OF THE DRAWING

In the drawing:
FIG. 3 is a longitudinal sectional view of a lamphouse for a projector which incorporates the present invention,
and FIG. 4 is an isometric view of one form of the shutter used in the lamphouse of FIG. 3.

DETAILED DESCRIPTION OF THE PREFERRED EMBODIMENT

Figure 1:
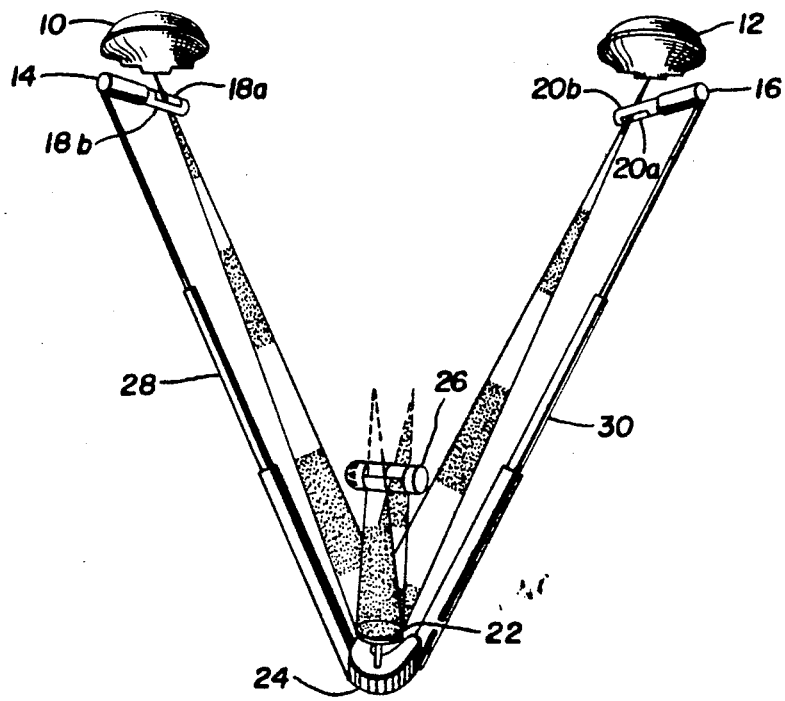
FIG. 1 is a schematic representation of the concept of the stereo image alternator and the state of the prior art and will not be specifically referred to again hereinafter.
Figure 2:
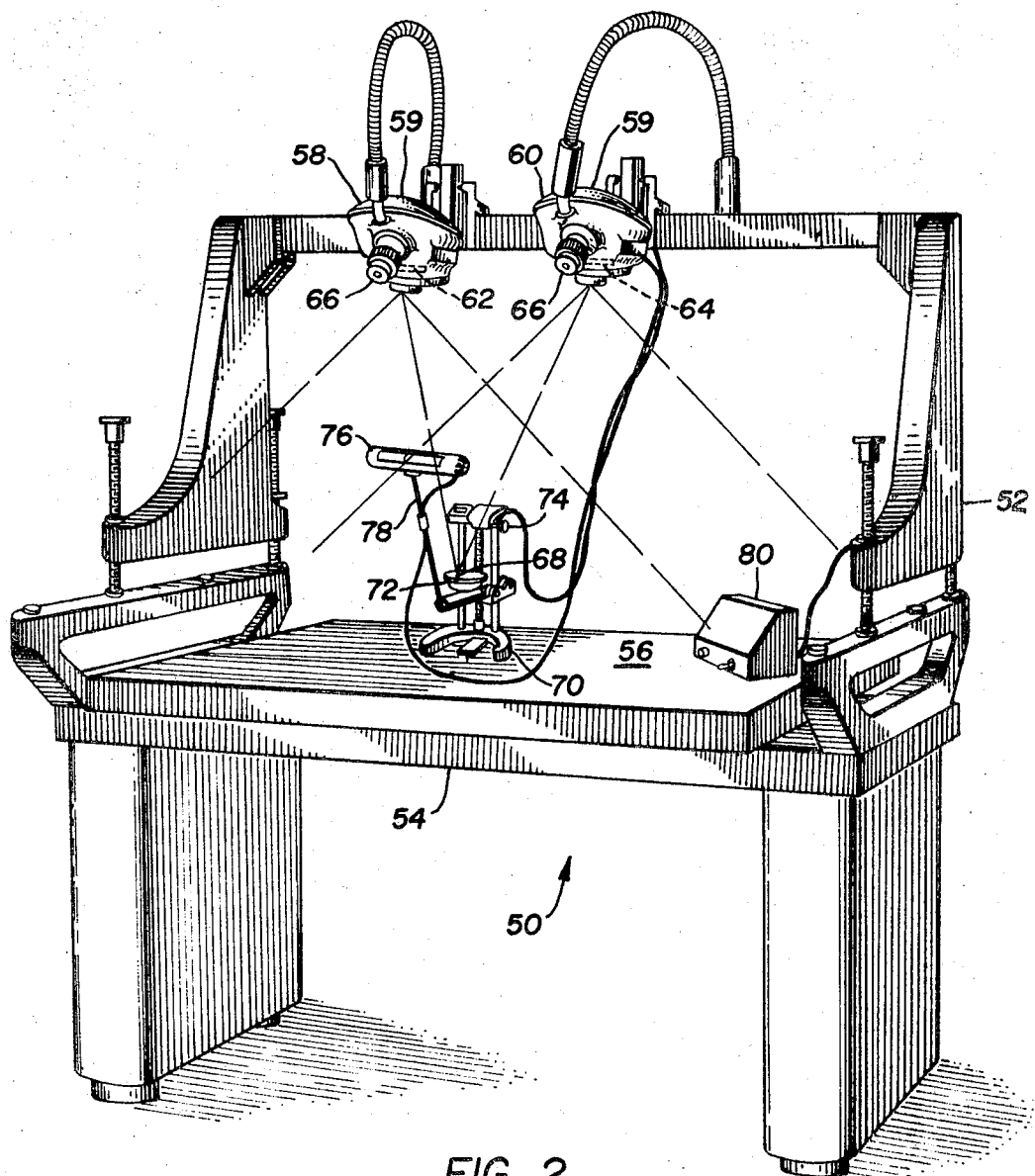
FIG. 2 is a general perspective view of a photogrammetric stereo map plotter incorporating the present invention therein.

In the following description of the various views of the drawing and explanation of the operation thereof, like reference numerals refer to identical parts of the apparatus. Referring now to FIG. 2, wherein there is shown a general perspective view of a photogrammetric stereo map plotter which is indicated generally by numeral 50. The stereo map plotter 50 is characterized by a supporting frame or superstructure 52 which is erected on a mapping base 54 having a mapping surface 56.

On the supporting frame 52 are carried a pair of projectors 58 and 60 in which a pair of stereo-diapositives 62 and 64 are held respectively. The diapositives 62 and 64 are each illuminated by an individual lamp, held in a lamphouse 66, which fully transilluminates the diapositives 62 and 64 so that individual projection lenses, not shown, aligned therewith project a pair of stereo images of said diapositives alternately into the space above the mapping surface 56 in the manner described hereinabove. The projectors 58 and 60 each include an ellipsoidal reflector 59 which forms a dome over the projector. The ellipsoidal reflectors 59 act to cause the light from the lamphouse 66 to fully illuminate the area of the diapositives 62 and 64, thereby permitting projection of the full area of the diapositives.

Each of said projectors 58 and 60 is provided with three mutually perpendicular rotational and three mutually perpendicular linear translational degrees of freedom to permit the same relative spatial orientations of the projectors above the mapping surface 56 as the orientation of the aerial cameras above a datum such as sea level at the instant the aerial photographs were exposed. When the projectors 58 and 60 are correctly oriented, the light rays from the common images on the two diapositives intersect at 68 in the space above mapping surface 56. The intersection of all common image points establishes a three-dimensional spatial model in the space above mapping surface 56.

To determine the height of the intersection 68 above surface 56, a tracing table 70 is provided having a vertically movable platen 72. The top surface of the horizontal platen 72 is moved vertically into coincidence with an intersection point 68. Calibrated means 74 is provided to give a relative vertical measurement of the height of intersection point 68 above a reference datum. A viewing shutter 76 is demountably attached to tracing table 70 by means of support arm 78. Electronic circuit means 80 is provided and is interconnected with the various shutters to control and synchronize the operation thereof.

Referring now to FIG. 3, wherein there is shown a longitudinal sectional view of a lamphouse, indicated generally by numeral 66. The lamphouse assembly 66 comprises a housing 82 which encloses and to which are attached the other components of the lamphouse. The housing 82 is generally tubular with one end thereof constricted in diameter. An external thread 84 is formed on the constricted end and is threadedly engaged with baffle 86 by means of internal thread 88 in baffle 86, which has an inwardly projecting flange 90. Centering body 92 is compressively held between flange 90 and the end of housing 82, however, body 92 is not rigidly held for reasons explained hereinafter. An axially projecting annular section 94 of centering body 92 has an external thread 96 thereon. Thread 96 is in engagement with internal thread 98 on vertical adjustment ring 100. Ring 100 has an inwardly projecting flange 102 which is compressively held, again not rigidly, between pressure plate 104 and base support member 106. Plate 104 is fastened to member 106 by means of a plurality of screws 108. Flange 102 fits into a recess formed by undercut 110 on the outward end of member 106 and plate 104.

Attached by means of screws, not shown, to the upper face of support member 106 is a lamp and motor mount 112 having a bore 114 cut therein into which a synchronous motor 116 is fitted. Also attached to mount 112 is a lamp socket 118 into which is inserted a constant brightness lamp 120 which has a high wattage to envelope size ratio. Socket 118 is attached to mount 112 by means of screws 122.

Mounted on the rotatable shaft 124 of synchronous motor 116 is a shutter 126, which is more fully depicted in FIG. 4. The shutter 126 comprises a hub 128, a flared cup-like section 130 which is attached to the hub 128 by screws 132, and a pair of shutter blades 134 and 136. Hub 128 includes a bore 138 which mates with shaft 124.

As can be seen in the drawing, shutter 126 has a pair of shutter blades 134 and 136 which are folded back over the hub. The blades 134 and 136 are regularly spaced about the circumference of section 130, are arcuate axially extending cylindrical sections, having a common locus of centers of curvature coincident with the axis of the shaft of the motor, and have an angular extension of 90 degrees. However, many factors influence the ultimate configuration of the shutter. The speed of rotation of motor 116 dictates the number of blades required, due to the requirement that the eye perceive a continuous image. The repetition rate of the flashes should be 50 flashes per second or higher, generally in the order of 60 flashes per second. Therefore, if an 1800 revolutions per minute motor is employed, at least two blades are required; if 3600 revolutions per minute motor is employed, at least a single blade is then required. In addition, the configuration of the structure of the shutter is contingent on the torque capacity of the motor and unbalanced dynamic loading which are permissible within the operating capacity of the motor. Although synchronous motors generally are acceptable, that class of synchronous motors termed stepping motors are preferable because of the ease of control and the size. Stepping motors have very low torque capacity and therefore, the shutter, as shown, is constructed of very thin, lightweight material, either metallic or organic. The dynamic balance requirement dictates that the shutter be well balanced in order that efficient, reliable operation may occur. Hence, a single shutter blade design is not likely to bring such operation. However, the scope of the invention includes a shutter wherein the alternate sections are transmissive and nontransmissive to light, each section having an angular extension of 180/$n$ degrees, wherein $n$ is the number of blades. In other words, the transmissive sections need not be physically open, but could be filled by a material transmissive to light. Therefore, a single bladed shutter which is dynamically balanced is feasible if the application requires.

The shutter blades 134 and 136 fold back over lamp 120 in order to completely block light emanating from lamp 120 when in position between the lamp and the projector with which the lamphouse is ultimately associated. The lamp 120 is included within the periphery of shutter 126. To accomplish this without using a shutter size which the stepping motor could not drive and control, a lamp having a high ratio of wattage to envelope size is required. In addition, to improve the long-term performance of the equipment, a constant brightness lamp is required. A standard tungsten filament, glass envelope lamp cannot, at present, fulfill these requirements. Over a period of time in operation, the tungsten vaporized during operation is deposited on the interior of the envelope when the lamp is in operation, due to the relative temperatures of the filament and the envelope. This deposition tends to cloud the envelope gradually and concurrently restrict the light output of the lamp. Also, due to the temperatures involved, a glass envelope cannot be located close to the filament in high wattage lamps, thereby requiring that high wattage lamps be large in size.

At present, the only lamp which can meet these characteristics is the so called "quartz-halogen" lamp. In this lamp, quartz is employed for the envelope and due to its superior thermal properties may be located much nearer the lamp filament than can a glass envelope, thereby creating a much higher wattage to envelope size ratio. Also, by including in the envelope one of the halogen elements, such as bromine or iodine, the problem of deposition of tungsten on the envelope has been effectively eliminated. The vaporized tungsten combines with the vaporized halogen to form a transparent chemical compound which is stable at the temperatures of the envelope, now closer to the filament, and therefore, hotter. Upon removal of power to the lamp, the filament cools far faster than the envelope and when the tungsten halogen compounds break down, the tungsten is redeposited on the cool filament, rather than the hot envelope, leaving the envelope clear and free of deposits. Therefore, the quartz-halogen lamp fulfills the requirements of a constant brightness, high wattage to envelope size lamp. It is anticipated that other lamps of similar characteristics will be developed in the future and the present invention encompasses the use of such lamps within its scope.

Returning now to FIG. 3, means are provided therein for adjusting the position of the lamp and shutter assembly within the housing to provide alignment of an individual lamphouse with a given projector. Axial adjustment is gained by threaded engagement between centering body 92 and adjustment ring 100. As ring 100 is rotated, the relative axial position of body 92 and member 106 is adjusted. To prevent rotation of the entire internal assembly during the adjustment, an anchor pin 140 engages an axially extending keyway 142 in member 106. Pin 140 passes through an aperture in baffle 86 and is threadedly engaged with body 92. Flange 102 is allowed to rotate between pressure plate 104 and support member 106.

Radial adjustment is gained by lateral adjustment screws 144 which cooperate with anchor pin 140 to slide the support member 106 and centering body 92 into the desired position. In cooperation with the adjustment screws 144 and pin 140, the outer diameter 146 of centering body 92 is smaller than the inner diameter 148 of baffle 86, thereby providing a generally annular space therebetween. This annular space allows adjustment of the lateral orientation of the lamp and shutter assembly relative to housing 82 because the centering body 92 may slide laterally between housing 82 and baffle 86.

Cooling means are provided in the lamphouse to remove excess heat. The means include a plurality of apertures 150 spaced circumferentially around the housing 82. The baffle 86 extends along housing 82 beyond the apertures 150. The internal wall 152 of baffle 86 is spaced from the outer wall 154 of housing 82 to allow movement of the cooling air through the apertures 150. Baffle 86 acts to restrict light leaving through apertures 150 from interfering with the images projected onto platen 68.

In addition, a heat shield 156 is attached to mount 112 by screws 158 and is located between lamp 120 and stepping motor 116 to shield the motor from the direct radiant heat from the lamp 120. If the heat level inside the lamphouse becomes too high for the motor to operate, means sensitive to the temperature switch the lamp off thus protecting the motor. In this case, a thermostat 160 is attached by screw 162 to support 106. The thermostat 160 is located near to the stepping motor 116 to acquire as accurate a reading as possible of the localized ambient temperature around the motor.

The wires interconnecting the lamp 120, the motor 116, and the thermostat 160 with external power and control means are fed out of the lamphouse through a grommet 164 placed in aperture 166 in the housing 82.

The lamphouse assembly 66 is attached to a projector, such as 58 or 60, by means of an adaptor ring 168. Ring 168 is mounted to the projector by means of a plurality of screws 170 which are located in counterbores 172 in ring 168. An internal shoulder 174 is formed in housing 82 adjacent to the end wherein the lamp is located. Ring 168 fits against shoulder 174 and the housing is fastened to the ring by a plurality of captive attachment screws 176 which are held captive by pins 178 through the screws.

It can be seen, therefore, that an improved lamphouse assembly is provided which may be adapted for use with existing projectors wherein the advantages originally offered by the projectors in photogrammetric stereo map plotters may be retained while incorporating the stereo image alternator concept therein. By use of similar adapting techniques, the lamphouse shown may be added to other existing projectors.

While there has been shown and described what is considered to be a preferred embodiment of the present invention, it will be obvious to those skilled in the art that various changes and modifications may be made therein without departing from the invention as defined in the appended claims.

I claim:
1. An improved lamphouse for projectors for stereo image alternator type stereo map plotters comprising:
   (a) a housing having an opening therein;
   (b) a quartz-halogen lamp having a high wattage to envelope size ratio mounted in the housing in juxtaposition with said opening in said housing;
   (c) a stepping motor having a rotatable shaft which rotates at an angular rate of at least 1500 revolutions per minute;
   (d) a shutter fixedly attached to the shaft of the stepping motor the motor being mounted in the housing and positioned therein such that the shutter is rotatable about the envelope of the lamp, said shutter comprising:
      a hub for mounting said shutter on said shaft of said stepping motor, and
      two axially extending cylindrical segment shutter blades extending through approximately ninety degrees;
   (e) a lamp socket mounted in said housing for mounting said lamp thereon;
   (f) means for attaching said lamphouse to the projector;
   (g) means for thermally insulating said stepping motor from said quartz-halogen lamp;
   (h) means for cooling the interior of said lamphouse, and
   (i) heat sensitive switching means serially connected with said quartz-halogen lamp, the means being located adjacent to said stepping motor;
whereby upon rotation of the motor and shutter at a constant angular velocity, light rays from the lamp are alternately stopped and released through the opening in the housing.

2. A lamphouse according to claim 1, which is further characterized by the inclusion of:
   an intermediate mounting member, said lamp socket and said stepping motor being mounted thereon;
   means located between said housing and the intermediate mounting member for laterally adjusting the relative position thereof; and
   means located between said housing and the intermediate mounting member for axially adjusting the relative position thereof.

3. A lamphouse according to claim 2, in which:
   said means for insulating is a heat shield attached to said intermediate mounting member and extending between said lamp and said stepping motor to shield said motor from the direct rays from said lamp;

said means for cooling includes a plurality of apertures in said housing to allow for natural convective cooling, and said heat sensitive switching means is an automatically resettable thermostat attached to said intermediate mounting member adjacent said stepping motor.

4. A lamphouse according to claim 3, in which:

said means for laterally adjusting includes a plurality of adjustment screws threadedly engaged in said housing and bearing against said intermediate mounting member, and said means for axially adjusting includes:

an externally threaded section of said housing surrounding a second opening in said housing, the second opening being located opposite said first opening, an internally threaded annular member threadedly and adjustably engaged with the threaded section of said housing, and a pressure plate attached to said intermediate mounting member and compressively capturing the edge of the annular member therebetween.

References Cited

UNITED STATES PATENTS

| | | | |
|---|---|---|---|
| 2,362,030 | 11/1944 | Seemann | 353—6 |
| 2,837,965 | 6/1958 | Goldsmith | 353—52(X) |
| 3,296,699 | 1/1967 | McGivern | 353—6 |
| 3,464,766 | 9/1969 | Knauf | 353—6 |

WILLIAM D. MARTIN, Jr., Primary Examiner

U.S. Cl. X.R.

350—275; 353—52, 88